Figure 1:
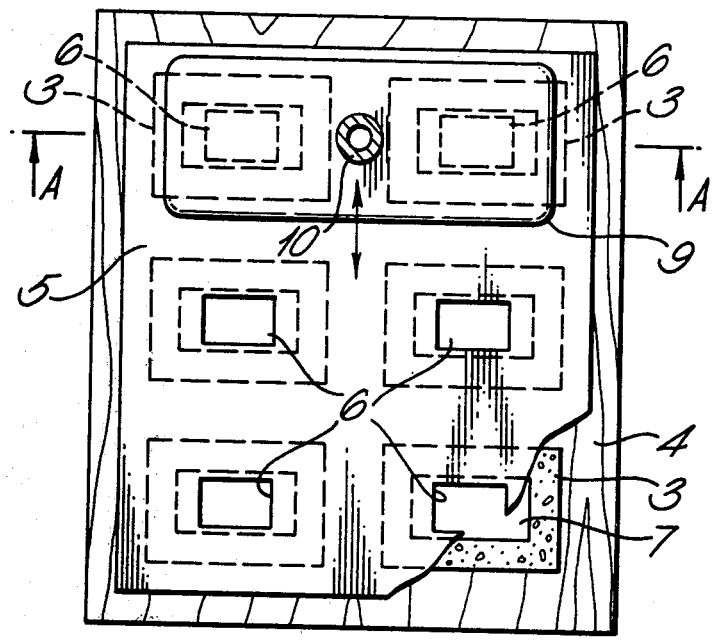

United States Patent [19]

Ogden

[11] 4,151,239
[45] Apr. 24, 1979

[54] IMPROVEMENTS IN AND RELATING TO BUILDING BLOCKS

[75] Inventor: Dennis H. Ogden, Wolverhampton, England

[73] Assignee: British Industrial Plastics Limited, Manchester, England

[21] Appl. No.: 841,588

[22] Filed: Oct. 11, 1977

[51] Int. Cl.² .............................................. B29D 27/04
[52] U.S. Cl. ................................ 264/46.6; 52/309.12; 52/405; 264/267; 264/DIG. 2
[58] Field of Search .................. 264/46.6, 36, DIG. 2, 264/267; 52/405, 309.12

[56] References Cited

U.S. PATENT DOCUMENTS

| | | | |
|---|---|---|---|
| 1,953,452 | 4/1934 | Wertz | 264/36 |
| 2,313,110 | 3/1943 | Wertz | 264/36 |
| 2,789,095 | 4/1957 | Lindvig | 264/DIG. 2 |
| 2,809,172 | 10/1957 | Keen | 264/50 X |
| 3,592,207 | 7/1971 | Borello | 264/46.6 X |
| 3,653,170 | 4/1972 | Sheckler | 52/309.12 X |
| 3,858,839 | 1/1975 | Bowman | 264/36 X |
| 3,885,363 | 5/1975 | Whittey | 52/405 X |
| 4,002,002 | 1/1977 | Barnhardt | 264/46.6 |
| 4,060,953 | 12/1977 | Milne | 264/36 |
| 4,067,759 | 1/1978 | Vrolyk et al. | 264/36 X |

FOREIGN PATENT DOCUMENTS

| | | | |
|---|---|---|---|
| 1364174 | 5/1964 | France | 264/46.7 |
| 1046077 | 10/1966 | United Kingdom | 264/46.3 |

Primary Examiner—Philip Anderson
Attorney, Agent, or Firm—Cushman, Darby & Cushman

[57] ABSTRACT

Here is disclosed a method of manufacturing building blocks filled with a cured aminoplast resin foam by forming a curable foam, presenting the cavity to and in sealing relationship with one end of a delivery pipe for the foam and injecting the curable foam through the delivery pipe into the cavity until a back pressure is developed in the delivery pipe. Apparatus for manufacturing the building blocks is also described.

8 Claims, 2 Drawing Figures

IMPROVEMENTS IN AND RELATING TO BUILDING BLOCKS

The present invention relates to building blocks of the kind formed with at least one cavity therein extending through or nearly through the block from one face through to the opposite face. Blocks having at least one such cavity will be referred to simply as "building blocks" in this specification.

In particular, the invention is concerned with a method and apparatus for filling at least one cavity in a building block with a cured foam of an aminoplast resin in order to enhance the thermal insulation properties of the block.

According to the present invention a cavity in a building block filled with a cured aminoplast resin foam is produced by a method including the steps of forming a curable foam from a solution of an aminoplast resin and a curing agent for the resin, presenting the cavity to and in sealing relation with one end of a delivery pipe for the foam and injecting said curable foam through the delivery pipe into the cavity until a back pressure is developed in the delivery pipe.

Preferably, successive cavities are filled in turn by the method just described, the pipe being traversed across said cavities (or said cavities being traversed relative to the pipe) at a rate such that each cavity is filled.

Hitherto a number of foam delivery pipes connected through a distributor to a common foam generator has been used, the free ends of the pipes being simply inserted loosely into or positioned just above a like number of cavities. The delivery of foam is timed to fill all the cavities, but due to the difficulty of balancing the flow rates in the individual pipes, this method tends to afford an unsatisfactory degree of control over both pressure and density of filling. By filling individual cavities until a back pressure is developed in the pipe the density of the filling can be held sensibly constant. Furthermore, where the block is porous, the back pressure can be used to force some of the foam into the body of the block, thereby "keying" the foam into the cavity.

Advantageously, the method of the invention is incorporated into the block-making process, for example immediately after curing the "green" blocks, although in this case a preliminary cold water spray treatment to cool hot-cured blocks can be helpful in minimising shrinkage of the foam on curing. Conveniently, blocks are filled whilst arranged in rows, either on pallets or on a conveyor band, the foam delivery pipe being traversed along successive rows of blocks, these successive rows being presented to the pipe by an indexing arrangement. Provided that injection does not stop for more than the gel time of the particular foam formulation being used, simple stop-start operation of the foam generating equipment is sufficient. If longer delays are likely then means must be provided for purging material from the foam generator and delivery pipe between runs to avoid gelation in the pipe.

According to a further aspect of the invention, apparatus for carrying out the method of the invention includes a foam delivery pipe provided with a foam discharge outlet, together with means operable to present said outlet to the cavity so as to effect a seal around the margins of the cavity mouth whilst so presented.

Preferably, the foam delivery pipe terminates in a "shoe" or shoe-like cover means containing the outlet and mounted for traversing across a row of blocks so as to present the outlet to a succession of cavities to be filled. In a particularly preferred embodiment of the invention a template is interposed between the shoe and the blocks, apertures corresponding to cavities to be filled being provided in the template over which the shoe is traversed. Conveniently the block-contacting face of the template has a resilient surface capable of sealing around each aperture so as to prevent or at least minimize leakage of foam across the faces of the blocks.

The shoe is preferably designed so that its foam discharge outlet can register with more than one aperture in the template at any one time and conveniently the foam discharge outlet is arranged so that the shoe can be traversed continuously relative to a row of blocks without stopping the foam generating apparatus.

Preferably the shoe is resiliently urged against the template so as to exert a pressure thereon, thereby controlling the maximum back pressure developed in the delivery pipe. By using a template in this way it is possible to minimize the risk of blocks being coated with foam on their external surfaces. Furthermore, resilient mounting of the shoe can provide a safety valve feature, in that if the pressure in the pipe ever exceeds the pressure of the shoe on the template, then foam can escape over the face of the template remote from the blocks.

A preferred embodiment of the invention will now be described by way of example with reference to the accompanying drawings in which:-

Figure 2:
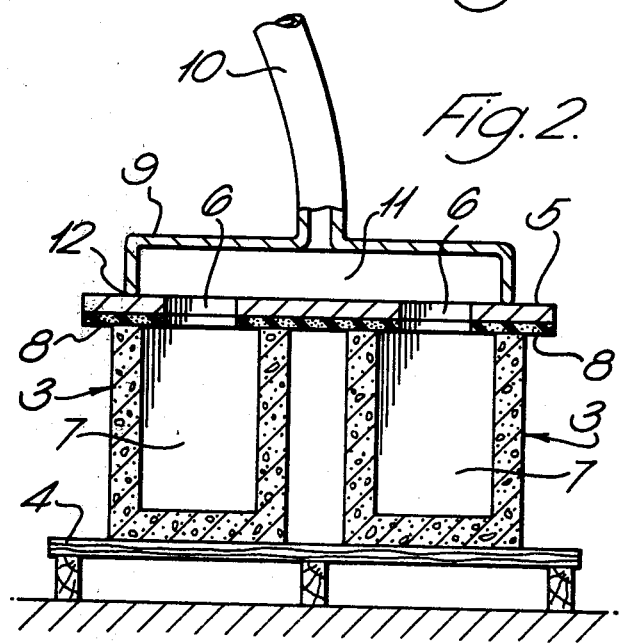

FIG. 1 is a schematic plan view partly in section, of part of an apparatus for filling cavities in building blocks with cured aminoplast resin foam and, FIG. 2 is a cross sectional side view along line AA' of part of FIG. 1.

In the Figures, two rows of building blocks 3 stand side-by-side on a pallet 4. Above the blocks is disposed a template 5 having a plurality of apertures 6 corresponding to the cavities 7 in the blocks beneath. The underside of the template carries a resilient foam layer 8 which in use effects a seal between the template and the upper face of the blocks, against which it presses. On the opposite, upper face of the template a shoe 9 is mounted for traversing backwards and forwards over the template in the direction indicated by an arrow, namely lengthwise of the two rows of blocks 3. The shoe is connected by a flexible pipe 10 to a conventional urea formaldehyde resin foam generating apparatus which is not shown and which need not be described in detail for present purposes.

The shoe is resiliently urged towards the template by spring means (not shown, in the interest of simplicity) and has a foam discharge outlet 11 in its template-contacting face 12. As shown in FIGS. 1 and 2, the outlet 11 registers with the template apertures 6 but does not (and need not necessarily) correspond in shape thereto. The outlet 11 is of such a size that when displaced over the template it fills one cavity completely before overlapping the next cavity and commencing filling of the latter. In fact, as shown, the outlet fills two cavities simultaneously, but in different side-by-side blocks.

In operation, the shoe starts at one end of the row of blocks, the foam generator is started up and the first pair of cavities are filled with foam. During fillings, the shoe is displaced over the template at such a rate that each pair of cavities are filled to the point at which a sensibly constant back pressure is developed which is sufficient to force some foam into the walls of the respective blocks, the latter being fairly porous in the case of typical cement/lightweight aggregate blocks.

At the end of a row the movement of the shoe is halted and two new rows of blocks are advanced into position, for example, by moving the pallet and, if necessary, at the same time raising the template very slightly to provide the necessary clearance. The foam generation may also be halted, or the foam allowed to run to waste, depending on the time required to effect presentation of a new row of blocks.

Whilst the arrangement just described relies on the correct speed of displacement being selected it is equally possible to use a pressure-sensitive device such as a switch responsive to the back pressure developed in the pipe to control the speed of displacement and/or to control the foam generator.

It will be appreciated that the embodiment just described can be adapted for different blocks by simply fitting a different template having the appropriate aperture configuration. It may also be necessary to adjust the traverse speed, but otherwise the same apparatus should suffice for a range of block/cavity configurations.

What we claim is:

1. A method of producing a building block having a cavity filled with a cured aminoplast resin foam, the method including the steps of forming a curable foam from an aqueous solution of a urea-formaldehyde resin solution and a curing agent for the resin, bringing the cavity to be filled into sealing engagement with a cover or shoe-like discharge outlet at the end of a delivery pipe for the foam, and injecting the foam into the cavity until a back pressure is developed in the delivery pipe, said back pressure being sufficient only to force some of said foam into the material of said block, whereby the foam is retained therein.

2. A method according to claim 1 comprising filling in turn successive cavities in a row of building blocks by progressively displacing said cavities into sealing relation with said discharge outlet at the end of the delivery pipe.

3. A method according to claim 1 wherein successive cavities are filled in turn by progressively displacing said discharge outlet at the end of the delivery pipe across and into sealing relation with said cavities.

4. A method according to claim 3 wherein the displacement is carried out by indexing in a step-wise manner and foam formation is discontinued during said indexing.

5. A method according to claim 3 wherein the displacement and foam formation are continuous.

6. A method according to claim 1, wherein successive cavities are filled in turn by progressively displacing said cavities into sealing relation with said discharge outlet at the end of the delivery pipe.

7. A method according to claim 6 wherein the displacement is carried out by indexing in a step-wise manner and foam formation is discontinued during said indexing.

8. A method according to claim 6 wherein the displacement and foam formation are continuous.

* * * * *